(12) United States Patent
Furu-Szekely et al.

(10) Patent No.: US 10,941,799 B2
(45) Date of Patent: Mar. 9, 2021

(54) DEFORMABLE SLEEVE NUT AND A METHOD OF MANUFACTURING

(71) Applicant: MONOGRAM AEROSPACE FASTERNERS, INC., Los Angeles, CA (US)

(72) Inventors: Zoltan Furu-Szekely, Downey, CA (US); Behrouz Khodnegah, Huntington Beach, CA (US)

(73) Assignee: MONOGRAM AEROSPACE FASTERNERS, INC., Los Angeles, CA (US)

( * ) Notice: Subject to any disclaimer, the term of this patent is extended or adjusted under 35 U.S.C. 154(b) by 0 days.

(21) Appl. No.: 16/105,060

(22) Filed: Aug. 20, 2018

(65) Prior Publication Data
US 2018/0355902 A1 Dec. 13, 2018

Related U.S. Application Data

(62) Division of application No. 14/881,237, filed on Oct. 13, 2015, now abandoned.

(60) Provisional application No. 62/063,040, filed on Oct. 13, 2014.

(51) Int. Cl.
*F16B 19/10* (2006.01)
*F16B 37/06* (2006.01)

(52) U.S. Cl.
CPC ........ *F16B 19/1072* (2013.01); *F16B 37/067* (2013.01)

(58) Field of Classification Search
CPC ............. F16B 19/1054; F16B 19/1045; F16B 19/1063; F16B 19/1072; F16B 37/067
USPC ................................................ 411/34, 38, 55
See application file for complete search history.

(56) References Cited

U.S. PATENT DOCUMENTS

| | | |
|---|---|---|
| 2,030,169 A | 2/1936 | Huck |
| 2,157,354 A | 5/1939 | Sherman |
| 2,494,128 A | 1/1950 | Holmquist |
| 2,562,019 A * | 7/1951 | Colley ................. F16B 37/067 411/38 |
| 2,751,676 A | 6/1956 | Kaul |
| 2,803,984 A | 8/1957 | Swenson |
| 2,971,425 A | 2/1961 | Blakeley |
| 3,180,203 A | 4/1965 | Vaughn |
| 3,369,442 A | 2/1968 | Darby |

(Continued)

OTHER PUBLICATIONS

European Patent Office, European Search Report for EP 15189516.6 dated Feb. 15, 2016.

*Primary Examiner* — Flemming Saether
(74) *Attorney, Agent, or Firm* — McDonald Hopkins LLC (57) ABSTRACT

Disclosed is a method of manufacturing a deformable sleeve nut that includes selectively strain hardening only a first portion of a material blank while not strain hardening a second portion of the material blank, then, after strain hardening the first portion of the material blank, internally threading the first portion of the material blank to define a nut portion and machining the second portion of the material blank to define a deformable sleeve portion that includes an end portion and a bulbing portion positioned between the end portion and the nut portion, where the bulbing portion is constructed to bulb outwardly and form a load bearing flange when the bulbing portion is compressed between the end portion and the nut portion. Also disclosed is a deformable sleeve nut made with this process.

8 Claims, 6 Drawing Sheets

(56) References Cited

U.S. PATENT DOCUMENTS

| | | | |
|---|---|---|---|
| 3,461,771 A * | 8/1969 | Briles | F16B 19/1054 |
| | | | 411/34 |
| 3,463,046 A | 8/1969 | Welch | |
| 3,532,560 A | 10/1970 | Tomioka | |
| 3,667,340 A | 6/1972 | Black | |
| 4,203,346 A | 5/1980 | Hall | |
| 4,237,768 A | 12/1980 | Volkmann | |
| 4,457,652 A | 7/1984 | Pratt | |
| 4,950,115 A | 8/1990 | Sadri | |
| 5,051,048 A * | 9/1991 | Maddox | F16B 19/1072 |
| | | | 411/34 |
| 5,634,751 A | 6/1997 | Stencel | |
| 6,868,757 B2 * | 3/2005 | Hufnagl | B25B 23/1415 |
| | | | 411/38 |
| 7,836,745 B2 | 11/2010 | Tseng | |
| 7,857,563 B2 * | 12/2010 | Pratt | F16B 19/1054 |
| | | | 411/34 |
| 2006/0234800 A1 | 10/2006 | Horimura | |
| 2009/0053006 A1 | 2/2009 | Hufnagl | |
| 2012/0011702 A1 | 1/2012 | Pratt | |
| 2013/0272815 A1 | 10/2013 | Hufnagl | |
| 2014/0308090 A1 | 10/2014 | Boemer | |
| 2015/0010370 A1 | 1/2015 | Pratt | |

\* cited by examiner (Prior Art)
Fig. 1

DEFORMABLE SLEEVE NUT AND A METHOD OF MANUFACTURING

CROSS-REFERENCE TO RELATED APPLICATIONS

This application is a divisional application of and claims the benefit of U.S. application Ser. No. 14/881,237, filed on Oct. 13, 2015, entitled "A DEFORMABLE SLEEVE NUT AND A METHOD OF MANUFACTURING," which claims the benefit of Provisional Patent Application No. 62/063,040 filed Oct. 13, 2014, which is hereby incorporated by reference.

BACKGROUND

Blind fasteners and clamps are widely used. Applicant's OSI-Bolt® Fasteners is a type of blind fastener that is used in both composite and metallic airframe application as both a primary and secondary fastener. (Primary fasteners are subjected to more severe joint loads than secondary fasteners.) Blind type fasteners, where the blind side clamping surface is inserted through the fastener opening before engaging the blind side clamping surface, are popular because, unlike two-piece fastening systems that require where access to both sides of the fastener, the installation of a blind type fastener can often be facilitated from just one side of the fastener opening. This can simplify installation, particular when robotic installation is used, and also permits using blind fasteners in application where access to one side of the opening is restricted or unavailable, for example, in a closed structure such as some aircraft wings.

In situations where access to both sides of the blind fastener is restricted, if a failure occurs on the blind side, it can be difficult and time consuming to remove the failed fastener and replace it with a new fastener. There is a need for improved blind fasteners that reliably perform as expected.

DESCRIPTION OF THE ILLUSTRATED EMBODIMENTS

For the purposes of promoting an understanding of the principles of what is claimed, reference will now be made to embodiments illustrated in the drawings and specific language will be used to describe the same. It will nevertheless be understood that no limitation of the scope of the claims is thereby intended. Any alterations and further modifications in the illustrated device, and any further applications of the principles disclosed and illustrated herein are contemplated as would normally occur to one skilled in the art to which the disclosure relates.

Figure 1:
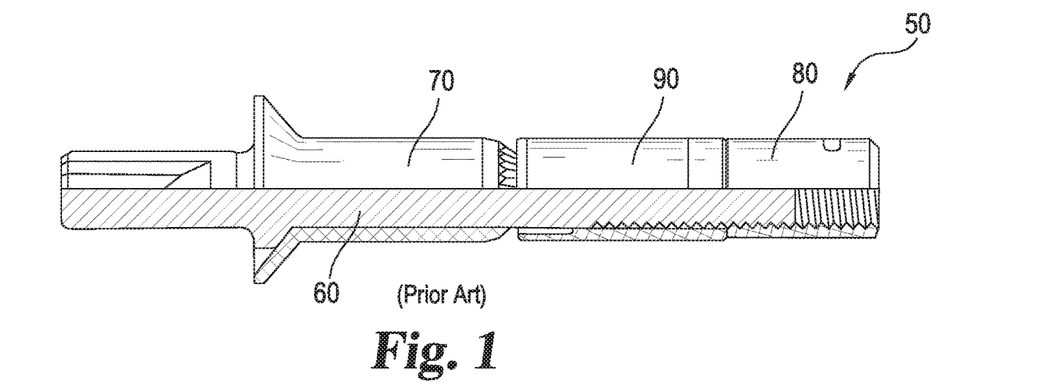
FIG. 1 is a side elevational view, partially in section, of a prior art assembled OSI blind fastener including a bolt, a nut, a sleeve and a body.
Figure 2:
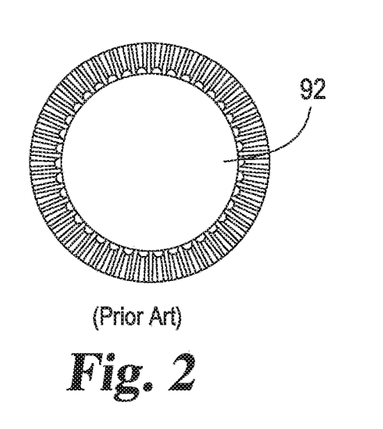
FIG. 2 is a front elevational view of the prior art FIG. 1 sleeve.
Figure 3:
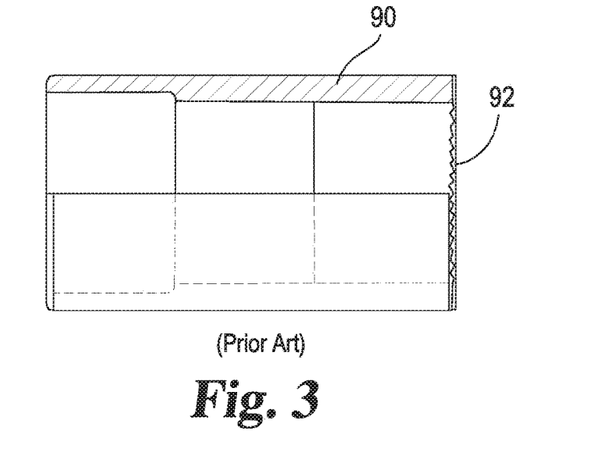
FIG. 3 is a side elevational view, partially in section, of the prior art FIG. 2 sleeve.
Figure 4:
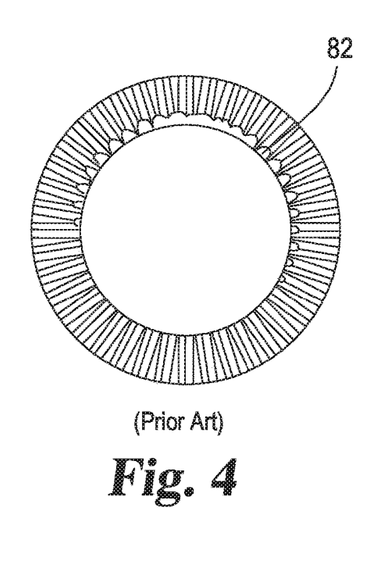
FIG. 4 is a front elevational view of the prior art FIG. 1 nut.
Figure 5:
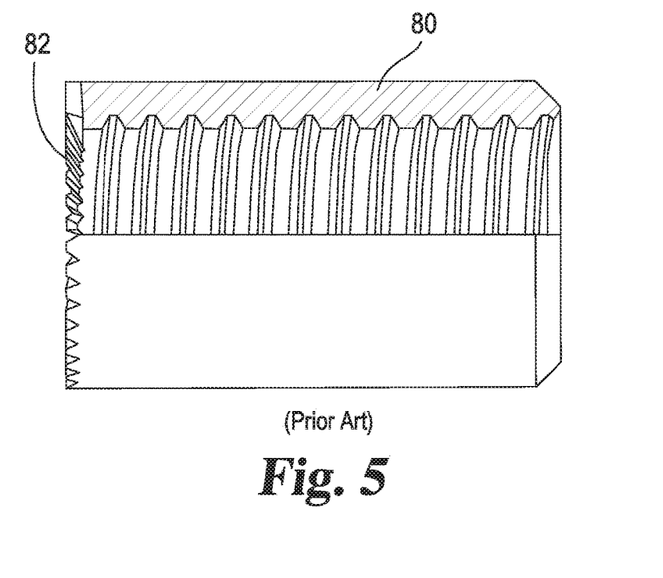
FIG. 5 is a side elevational view, partially in section, of the prior art FIG. 4 nut.

Referring to FIG. 1, a prior art OSI fastener is illustrated as fastener 50. Fastener 50 includes bolt 60, body 70, nut 80 and sleeve 90. Sleeve 90 is also illustrated in FIGS. 2 and 3 and nut 80 is also illustrated in FIGS. 4 and 5. After inserting fastener 50 into an opening and securing body 70 from rotating, rotation of bolt 60 relative to body 70 compresses sleeve 90 between body 70 and nut 80 causing sleeve 90 to bulb outwardly generating an enlarged flange that forms an enlarged clamping surface that cannot pass through the opening. Continued rotation of bolt 60 relative to body 70 moves the enlarged flange into contact with the part(s) being claimed and applies a clamping force between the enlarged flange from sleeve 90 and head 72 on body 70.

Fastener 50 requires a non-rotating interface between body 70, sleeve 90 and nut 80 because only body 70 can be secured from rotation during installation (nut 80 and sleeve 90 are inserted through the fastener hole and are not accessible in a "blind" installation). Thus, securing body 70 from rotating should also secure nut 80 from rotating, otherwise nut 80 could rotate with bolt 60 rather than compressing and advancing sleeve 90 to complete installing the fastener due to threaded engagement with bolt 60. To enhance a non-rotating interface, the end of body 70 that contacts sleeve 90, both ends of sleeve 90 and the end of nut 80 that contacts sleeve 90 may be knurled or otherwise include features that interlock sleeve 90, nut 80 and body 70 to reduce or prevent relative rotation between these components during installation. This is shown as knurling 82 on nut 80 in FIGS. 4 and 5 and knurling 92 on sleeve 90 as shown in FIGS. 2 and 3.

Fastener 50 utilized separate sleeve 90 and nut 80 structures because these components generally require different material characteristics. Sleeve 90 generally requires significant ductility to permit the formation of an enlarged flange while nut 80 generally requires significant strength to prevent internal threads from being stripped by bolt 60 and be sufficiently hard such that nut 80 does not significantly deform when a load is applied while, at the same time, sleeve 90 does deform. With separate components, material selection for sleeve 90 and nut 80 can be separately optimized for a particular application. A ductile material can be selected for sleeve 90 while a stronger, heat treated (hardened) material can be used for nut 80. For example, Applicant uses a material such as titanium or steel that has been hardened by heat treating to construct nut 80 while a malleable material, such as a solution treated AISI 304 Stainless Steel, is used for sleeve 90.

Applicant has identified that the two piece construction for nut 80 and sleeve 90, while addressing the required physical characteristics for these components, may cause other problems. Slippage between nut 80 and sleeve 90 results in a failed installation, because there is no alternative mechanism to hold nut 80 against rotation of bolt 60. This can be a significant problem if slippage occurs after partial expansion of sleeve 90, so that fastener 50 cannot be easily removed but installation cannot be completed without scrapping fastener 50, which may require cutting fastener 50 off. There is a need for an improved nut and sleeve combination that reduces the occurrence of failed installations.

Applicant has identified that by combining the nut and sleeve structure into a single structure, failure modes that previously occurred at the junction between the nut and sleeve structures can be significantly reduced or eliminated. However, the problem of different material performance requirements for these structures remains. Applicants solution to this problem is to selectively strain harden the portion of a material blank that is used for the nut portion while not strain hardening the remaining portion of the material blank that is utilized to form the deformable sleeve portion of the combined structure.

Figure 6:
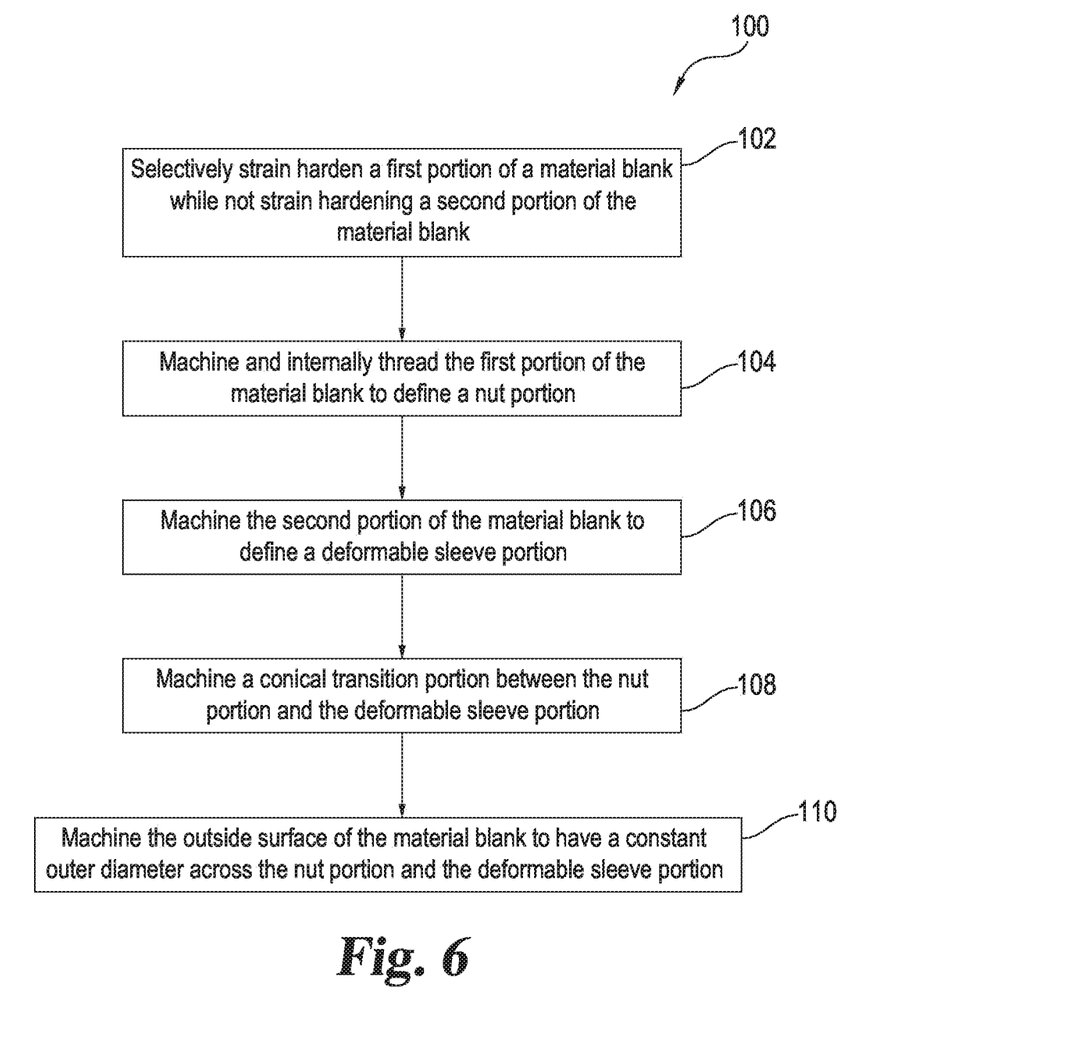
FIG. 6 is a flow chart of a method of manufacturing a deformable sleeve nut.

Referring to FIG. 6, process 100 is illustrated. Process 100 is a manufacturing process to produce a deformable sleeve nut that combines functions similar to nut 80 and sleeve 90 in a unitary structure constructed from a single piece of material. Process 100 begins with step 102 where a first portion of a material blank is selectively strain hardened while a second portion of the material blank is not strain hardened. Strain hardening process such as extruding and roll forming can be used in step 102. Process 100 continues with step 104 where the first portion of the material blank is machined and internally threaded to define a nut portion of the deformable sleeve nut. In step 106, the second portion of the material blank is machined to define a deformable sleeve portion. In step 108, a transition between the nut portion and the deformable sleeve portion is machined. The transition can be conical in shape or any other desired geometry. In step 110, the outer surface of the material blank, including the nut portion and the deformable sleeve portion, is machined to have a constant outer diameter.

It should be understood that steps 104, 106. 108 and/or 110 in process 100 may be performed in any desired sequence and/or at the same time. For example, the material blank may require a boring operation that passes through both the first and second portions as part of forming the nut portion and the deformable sleeve portion. Similarly, the outside surface could be formed before internal features are formed.

Figure 7:
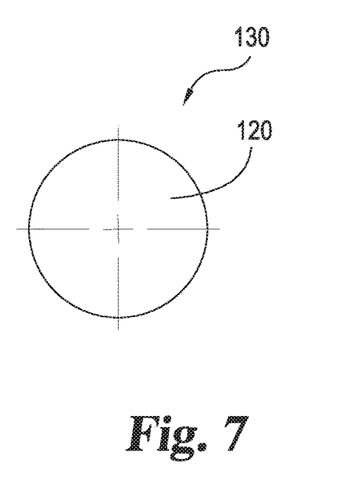
FIG. 7 is a front elevational view of a material blank.
Figure 8:
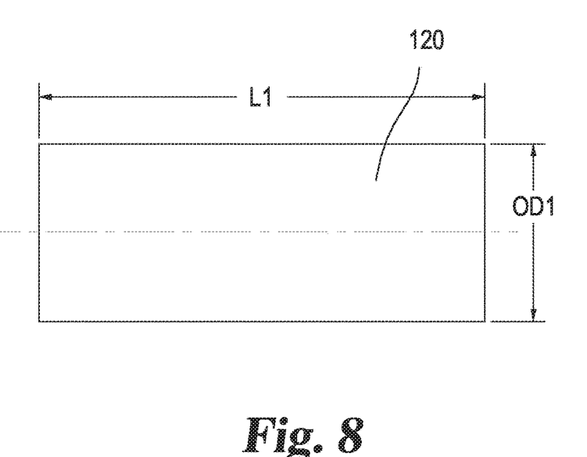
FIG. 8 is a side elevational view of the FIG. 7 material blank.

Referring to FIGS. 7 and 8, material blank 120 is illustrated. Material blank 120 has a length L1 and an outer diameter OD1. Material blank 120 is a continuous piece of a single material such as AISI 304 Stainless Steel. Other materials that are acceptable to use as material blank 120 include 300 and 400 series stainless steels and A 286 Precipitation Hardening Alloy.

Figure 9:
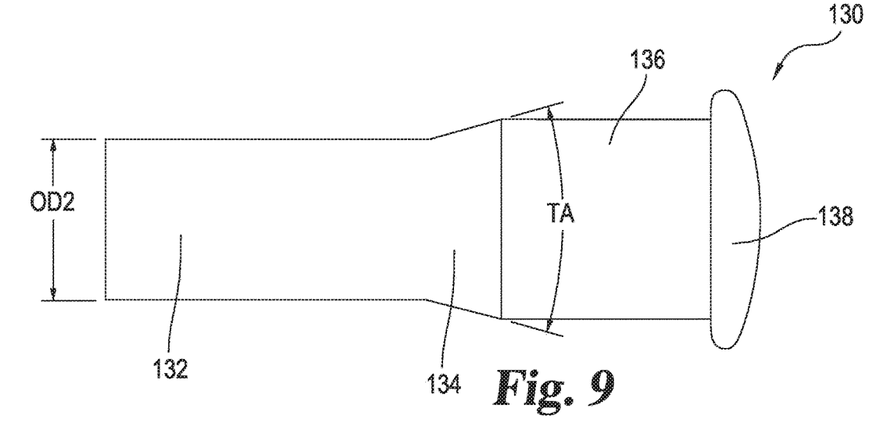
FIG. 9 is a side elevational view of a material blank after partial strain hardening.

Referring to FIG. 9, partially cold worked material blank 130 is illustrated. Partially cold worked material blank 130 includes cold worked portion 132, un-worked portion 136 and head 138 with transition 134 located between cold worked portion 132 and un-worked portion 136. Cold worked portion 132 is formed by a trapped extrusion process performed on a solution treated material blank 120. Transition 134 may be partially cold worked, but is less cold worked than cold worked portion 132. Head 138 is formed by cold working after cold worked portion 132 is formed. Head 138 is primarily formed to aid in orienting and handling cold work blank 130 during subsequent steps such as machining.

Figure 10:
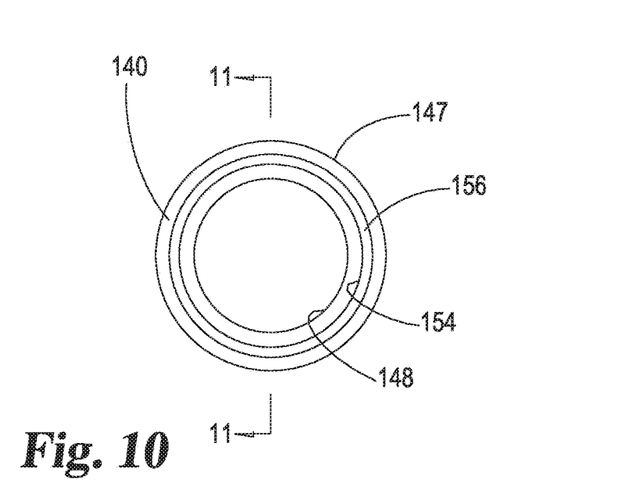
FIG. 10 is a front elevational view of a deformable sleeve nut.
Figure 11:
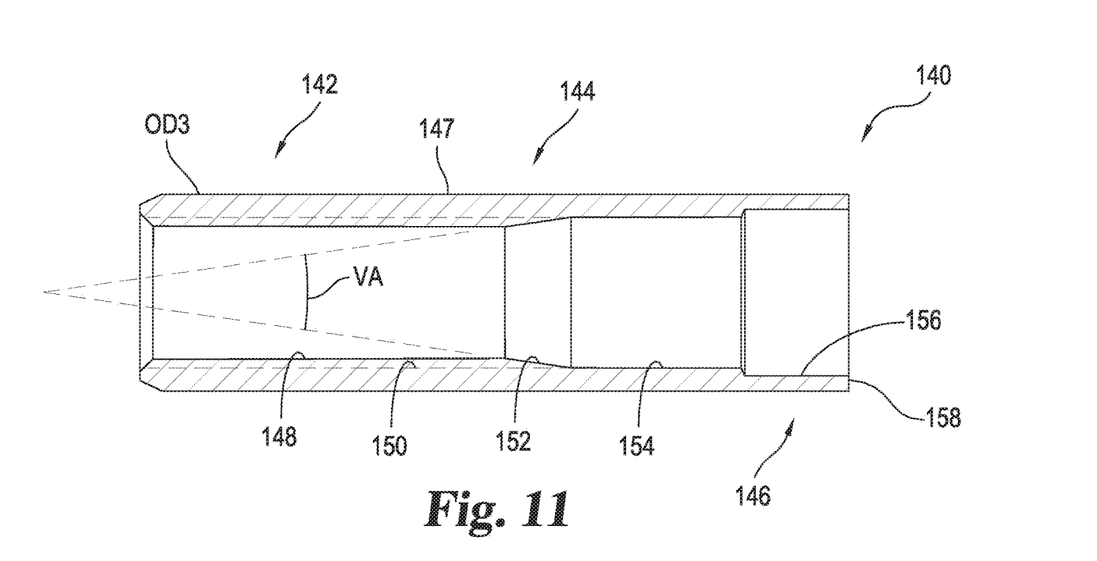
FIG. 11 is a side elevational cross-sectional view of the FIG. 10 deformable sleeve nut taken along lines 11-11 in FIG. 10.

Referring to FIGS. 10 and 11, deformable sleeve nut 140 is illustrated. Deformable sleeve nut 140 includes nut portion 142, transition portion 144 and deformable sleeve portion 146. Deformable sleeve nut 140 has an outer surface 147 that has a diameter OD3. Deformable sleeve nut 140 may have a constant diameter OD3 across substantially its entire length. Nut portion 142 is internally threaded with internal threads 148 defining major diameter 150. In the illustrated embodiment, transition portion 144 includes conical taper 152 that has a vertex angle VA, although the conical transition geometry is not limiting. In the illustrated embodiment, vertex angle NA is approximately equal to 15 degrees. In other embodiments, vertex angle VA can vary from between 10 degrees and 25 degrees. In yet other embodiments, vertex angle VA can vary from between 5 degrees and 90 degrees.

Deformable sleeve portion 146 also defines and includes internal diameter 154, insert recess 156 and end wall 158. In the illustrated embodiment, internal diameter 154 is approximately equal to major diameter 150. Insert recess 156 may be constructed and arranged to receive a plastic insert that may assist deformable sleeve portion 146 to preferentially bulb outwardly while potentially blocking deformable sleeve portion 146 from buckling inwardly upon application of a compressive force. While not illustrated, end wall 158 may optionally include geometries such as knurling to reduce or eliminate rotation against a body such as body 70.

Figure 12:
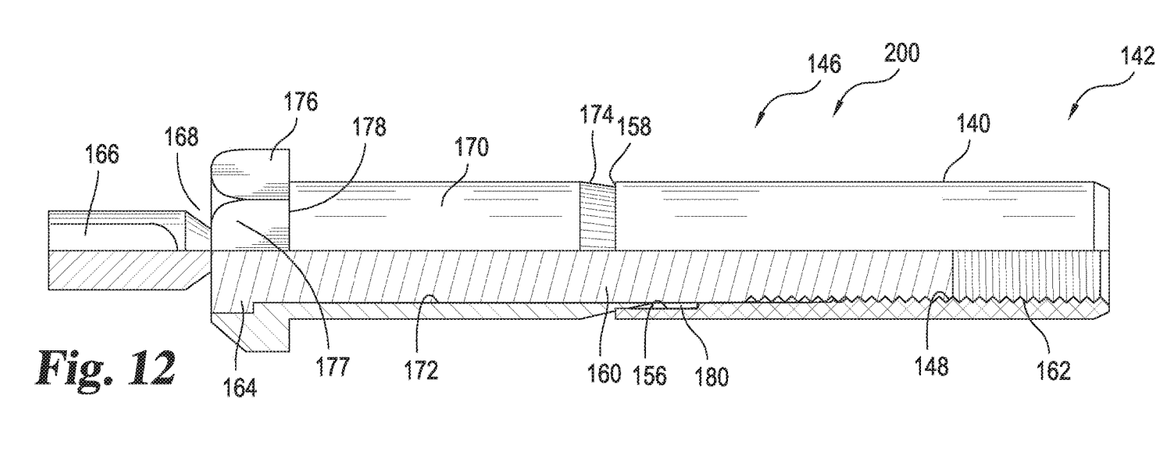
FIG. 12 is a side elevational view, partially in section, of a blind fastener which includes the FIG. 10 deformable sleeve nut.

Referring now to FIG. 12, fastener 200 is illustrated. Fastener 200 includes deformable sleeve nut 140, bolt 160, body 170 and insert 180. Bolt 160 includes external threads 162, head 164 and engaging portion 166 that is constructed and arranged to interface with an external tool to rotate bolt 160. Bolt 160 also optionally includes break groove 168 positioned between engaging portion 166 and head 164. Break groove 168 may be constructed and arranged to fracture when sufficient torque is applied to engaging portion 166, such as may be encountered when fastener 150 is fully installed as described below.

Body 170 defines bore 172 through which bolt 160 passes. Body 170 also includes tapered end 174 and head 176, which head 176 defining engaging portion 177 and surface 178. Engaging portion 177 is constructed and arranged to interface with an external tool to secure the relative position of body 170 when bolt 160 is rotated. Tapered end 174 may optionally include anti-rotation features such as knurling, which is shown in FIG. 12.

Insert 180 is positioned in insert recess 156. Insert 180 may define a substantially cylindrical shape. Insert 180 may be constructed from a relatively easily deformable material (compared to deformable portion 146) such as plastic. Insert 180 may be constructed and arranged to substantially fill the space between bolt 160 and deformable sleeve nut 140 defined by insert recess 156. Insert 180 may have sufficient compression strength to encourage deformable portion 146 to bulb outwardly when compressed while potentially blocking deformable sleeve portion 146 from buckling inwardly upon application of a compressive force.

Fastener 200 is assembled with bolt 160 passing through bore 172 in body 170, with threads 148 on deformable sleeve nut 140 threadingly engaged with threads 162 on bolt 160 with end 158 of deformable sleeve nut 140 abutting tapered end 174 of body 170.

Fastener 200 is installed by inserting it into an appropriate sized opening, securing body 170 and deformable sleeve nut 140 from rotating by securing engaging portion 177 with an appropriate tool and then rotating bolt 160 relative to body 170 utilizing a tool engaged with engaging portion 166 to cause deformable sleeve nut 140 to advance along bolt 160 toward body 170, thereby compressing deformable sleeve portion 146 between nut portion 142 and tapered end 174 on body 170. This causes deformable sleeve portion 146 to bulb outwardly and fold upon itself to form an enlarged flange.

Figure 13:
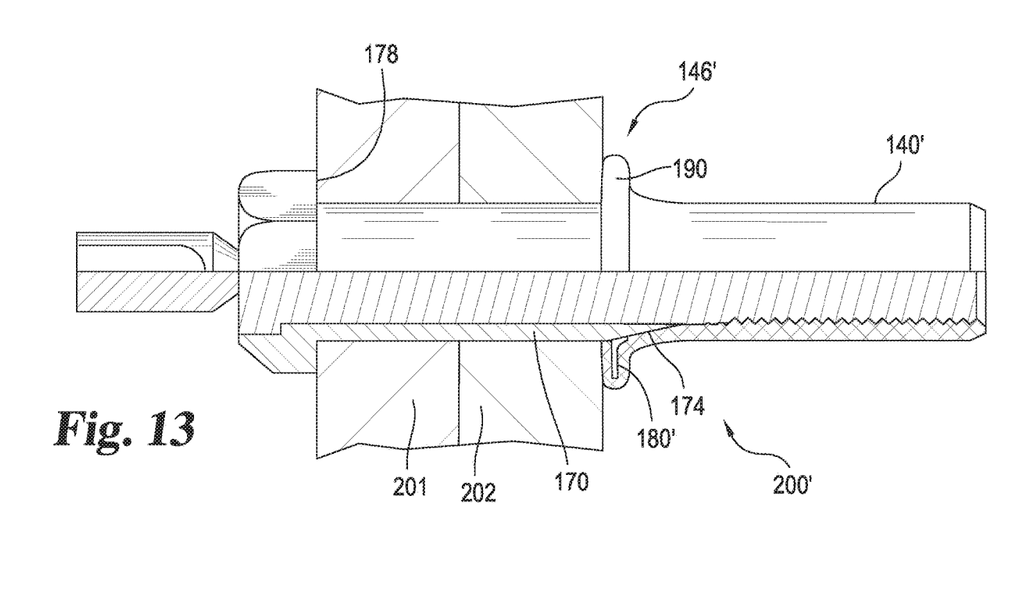
FIG. 13 is a side elevational view, partially in section, of the FIG. 12 blind fastener after it has been fastened to two panels.

Referring now to FIG. 13, fastener 200 is shown as installed through overlapping plates 201 and 202 as installed fastener 200'. Installed deformable sleeve nut 140' has been advanced toward body 170 sufficiently that deformed sleeve portion 146' has bulbed outwardly and advanced up tapered end 174, thereby expanding the internal diameter of deformed sleeve portion 146'. Deformed insert 180' is positioned inside bulbed flange 190 formed by deformed sleeve portion 146'. Overlapping plates 201 are clamped together between bulbed flange 190 and surface 178 on head 176.

Figure 14:
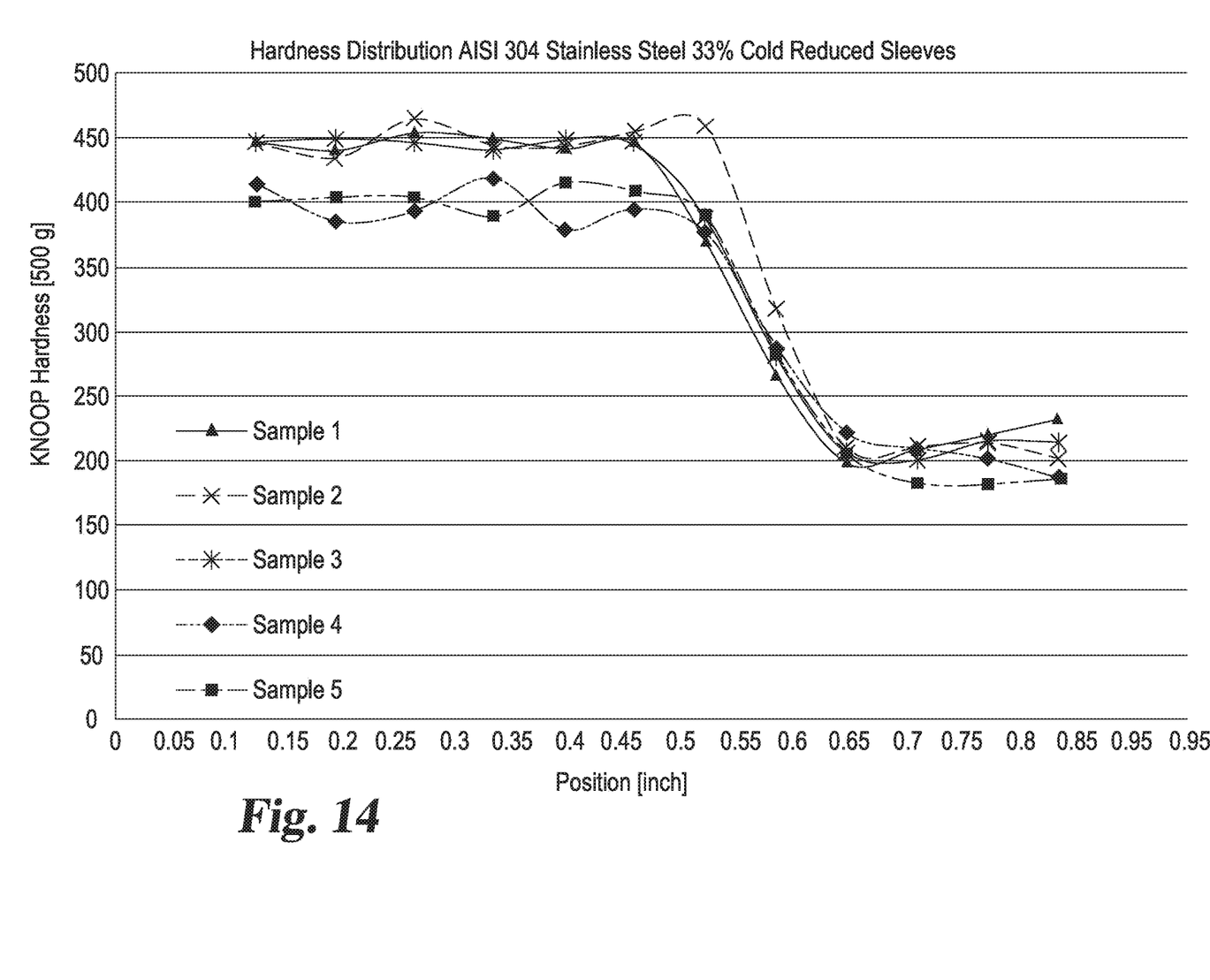
FIG. 14 is a hardness chart showing the KNOOP hardness along the length of five partial strain hardened deformable sleeve nuts.

Referring to FIG. 14, a chart of the hardness distribution along the length of deformable sleeve nut 140 is illustrated. The X-axis of the chart shows the relative position, measured in inches, long the length of deformable sleeve nut 140 where hardness was tested. The Y-axis of the chart shows the measured Knoop hardness, measured with a 500g load. The chart includes the results of 5 different specimens, each made of AISI 304 Stainless Steel, each having been subject to partial 33% cold working. Samples 1 through 3 were manufactured from one heat of raw material. Samples 4 and 5 were manufactured from a different heat of raw material. The location "0" starts at the threaded end of deformable sleeve nut 140, with larger measurement progressively advancing along the length of deformable sleeve nut 140 toward deformable sleeve portion 146.

As illustrated in FIG. 14, the method of partially cold working the material blank resulted in selectively hardening the portion of the blank cold worked. With nut portion 142 averaging approximately twice the hardness of deformable sleeve portion 146, with a distinct transition in the hardness at transition portion 144.

Additional testing also revealed that the ratio between the maximum and minimum measured hardness varies based on the size of the deformable sleeve nut produced (smaller deformable sleeve nuts are manufactured using smaller material blanks). Testing on ¼ inch diameter deformable sleeve nuts subjected to partial 33% cold work measured hardness ratios (max/min) of 1.85, 1.91, 1.92 and 1.87. Conversely, testing on 3/16" diameter deformable sleeve nuts subjected to partial 33% cold work measured hardness ratios (max/min) 2.31, 2.53, 2.79. In subsequent installation testing on the 3/16" diameter deformable sleeve nuts, the corebolt occasionally fractured during the installation process, indicating that the amount of cold work might need to be reduced for the 3/16" parts compared to the ¼" parts. Based on this data, nut portion 142 should be at least seventy-five percent harder than the hardness of deformable sleeve portion 146 but no more than one hundred and fifty percent harder.

Table 1, below, reports additional measured hardness ratios for ¼" sleeves and 3/16" sleeves subjected to partial 33% cold work.

TABLE 1

Hardness Ratios

| Sleeve-Nut Size | Raw Material Lot # | Cold Work Reduction/Equipment/Method | Hardness Ratio |
|---|---|---|---|
| 08 (¼" OD) | 20361 | 33% | 1.67 |
|  |  | Header | 1.49 |
|  |  | Trapped Extrusion | 1.57 |
|  |  |  | 1.78 |
|  |  |  | 1.81 |
|  |  |  | 1.79 |
|  | 004205A | 33% | 2.08 |
|  |  | Tensile Tester | 2.15 |
|  |  | Trapped Extrusion | 2.13 |
| 06 (3/16" OD) | 16887 | 33% | 2.12 |
|  | 19435 | Tensile Tester | 1.77 |
|  | 19435 | Trapped Extrusion | 2.55 |
|  | 16887 |  | 2.40 |
|  | 19435 |  | 2.40 |

All the specimens listed in Table 1 where determined to have been adequately work hardened, but, as already discussed, some of the 06 parts (3/16" OD) might require less hardening. The difference between the equipment used, i.e., tensile tester vs. header, is the speed of the extrusion process. The header is much quicker at cold working the parts, around 60 pieces a minute, while the tensile tester (in an R&D lab) took around 15-20 seconds to extrude a single blank. There were also differences in the material lots tested. Lot #20361 was wire in solution treated condition while the rest of the lot numbers were bar stock which was machined to the correct size before solution treating the blanks. (All specimens were solution treated before cold working.)

While the claimed subject matter has been illustrated and described in detail in the drawings and foregoing description, the same is to be considered as illustrative and not restrictive in character. All changes and modifications that come within the spirit of the disclosure are desired to be protected by the claims.

We claim:

1. A deformable sleeve nut for use in a blind side fastener that includes a body and a bolt threadingly engaged with the deformable sleeve nut, the deformable sleeve nut comprising:
    a cylindrical material blank having a strain hardened end and a non-strained hardened end;
    a nut portion formed in the strained hardened end, said nut portion having a first internal diameter with threading formed thereon;
    a deformable sleeve portion formed in the non-strain hardened end, said deformable sleeve portion having a second internal diameter that is greater than the first internal diameter;
    a conical transition portion positioned between the nut portion and the deformable sleeve portion, said conical transition portion: (i) being between the strain hardened nut portion and the non-strain hardened sleeve portion; and (ii) defining a vertex angle that is between 10 degrees and 25 degrees;
    wherein the deformable sleeve portion is constructed and arranged to bulb outwardly and form a load bearing flange when the bolt is moved to compress the deformable sleeve portion against the body; and
    wherein the sleeve nut has a substantially constant outer diameter between the strain hardened end and the non-strain hardened end.

2. The deformable sleeve nut of claim 1, wherein the nut portion of the material blank is strain hardened using a strain hardening process selected from the group consisting of: extruding and roll forming.

3. The deformable sleeve nut of claim 1, the hardness of the nut portion is at least seventy-five percent harder than the hardness of the deformable sleeve portion.

4. The deformable sleeve nut of claim 1 wherein the deformable sleeve portion includes a terminal edge and a bulbing portion positioned between the terminal edge and the nut portion, wherein the bulbing portion expands radially outward and concentrically around the terminal edge and then compresses inwardly when forming the load bearing flange.

5. The deformable sleeve nut of claim 4, wherein the deformable sleeve portion defines an internal diameter approximately equal to a major diameter of the internal threads in the nut portion.

6. The deformable sleeve nut of claim 1, wherein the vertex angle is approximately 15 degrees.

7. The deformable sleeve nut of claim 1 wherein the cylindrical material blank consists essentially of one selected from: 304 stainless steel, 300 series stainless steel, 400 series stainless steel, and A286 precipitation hardening alloy steel.

8. The deformable sleeve nut of claim 1 wherein an insert recess is provided at a terminal edge the non-strain hardened end that is spaced apart from the conical transition portion.

* * * * *